United States Patent
Demarthon et al.

(10) Patent No.: US 11,848,528 B2
(45) Date of Patent: Dec. 19, 2023

(54) METHOD FOR MAKING A BAYONET CONNECTING ELEMENT FOR A CONNECTOR

(71) Applicant: SOURIAU, Versailles (FR)

(72) Inventors: Simon Demarthon, Le Mans (FR); Emilie Tronchet, Saint Celerin (FR); Florian Moreau, Le Mans (FR); Patrick Allain, Juigné sur Sarthe (FR); Jimmy Defait, Ruille en Champagne (FR); Frédéric Noblet, Mulsanne (FR); Nathalie Hachoue, Sainte Luce sur Loire (FR)

(73) Assignee: SOURIAU, Versailles (FR)

( * ) Notice: Subject to any disclaimer, the term of this patent is extended or adjusted under 35 U.S.C. 154(b) by 0 days.

(21) Appl. No.: 17/723,630

(22) Filed: Apr. 19, 2022

(65) Prior Publication Data
US 2022/0337012 A1    Oct. 20, 2022

(30) Foreign Application Priority Data
Apr. 19, 2021    (FR) ...................... 2104047

(51) Int. Cl.
   *H01R 43/16* (2006.01)
(52) U.S. Cl.
   CPC .................. *H01R 43/16* (2013.01)

(58) Field of Classification Search
   CPC ...... H01R 43/16; H01R 43/18; H01R 13/625; B23B 35/00; F16B 21/04; Y10T 29/49194
   See application file for complete search history.

(56) References Cited

U.S. PATENT DOCUMENTS

| | | | | |
|---|---|---|---|---|
| 5,256,077 A | * | 10/1993 | Mattingly | H01R 13/625 285/396 |
| 6,808,407 B1 | * | 10/2004 | Cannon | H01R 13/625 439/314 |
| 7,431,531 B2 | * | 10/2008 | Carnevali | B25G 3/26 403/328 |
| 2011/0206333 A1 | | 8/2011 | Allain et al. | |

* cited by examiner

*Primary Examiner* — Donghai D Nguyen
(74) *Attorney, Agent, or Firm* — H&I PARTNERS; C. Andrew Im; Jean-Christophe Hamann

(57) ABSTRACT

A method for making a bayonet connecting element for a connector, according to which a connecting element body, with a hollow cylindrical general shape is made. The method includes making a through bore by drilling a wall of the body of the connecting element, from the outer surface of the wall. The outer surface of the wall is machined around the bore so as to create a conical contact surface around the bore. A lug is inserted into the bore, from the outer surface of the wall, so that a head of the lug projects from the outer surface of the wall of the connecting element. The lug having a conical contact surface corresponding to the conical contact surface of the bore.

6 Claims, 1 Drawing Sheet

METHOD FOR MAKING A BAYONET CONNECTING ELEMENT FOR A CONNECTOR

RELATED APPLICATIONS

This application claims priority from French Patent Application No. 2104047 filed Apr. 19, 2021, which is incorporated herein by reference in its entirety.

TECHNICAL FIELD OF THE INVENTION

The present invention relates to a method for making a connecting element, such as a base, for a bayonet connector. In particular, it applies to the mounting of lugs involved in the bayonet system of the connector on the main body of the corresponding connecting element.

BACKGROUND OF THE INVENTION

It is known to lock the connection between a plug and an electrical connector base, for example, by means of a bayonet system. More specifically, the plug is provided with a locking ring fixed in translation and adapted to be locked on the outer wall of the complementary base when the connection between the contacts of the plug and the contacts of the base is achieved. In turn, the main body of the base is provided with lugs projecting radially outwards from the outer wall of the base. These lugs are intended to cooperate with grooves formed in the inner wall of the locking ring, at the end of locking of the ring around the base, the lugs open into the orifices formed at the ends of the grooves, in order to make locking of the plug and the base irreversible, or at the very least make unintentional unlocking impossible.

Such a bayonet locking device is very interesting with regards to the speed of locking. Hence, it is widely used in many fields, such as in civil or military aeronautics, or any other application in an extreme environment.

There are numerous embodiments of the lugs on the body of the base. For example, the lugs may be carved in the mass. They are then made of the same material as the body of the base and have the mechanical characteristics of this material. Since the lugs are wearing parts, when the body is made of a light alloy, the wear resistance is then less than when the body is made of stainless steel. Otherwise, the lugs may be mechanically attached and, in this case, they could be made of a completely different material, and in particular of stainless steel, in order to meet wear requirements. Thus, it is known to attach lugs made of stainless steel on a base body made of an aluminium alloy. However, the body of the base should be treated so as to resist corrosion. Such a treatment usually consists of a protective layer, applied by chemical or electrolytic deposition. This protective layer enables such a connector to withstand different attacks from the environment and, in particular, to withstand humid environments by suppressing the risks of corrosion or rust.

It is also possible to proceed with the anti-corrosion deposition after setup of the lugs on the body of the base. Yet, this solution has a drawback of generating a crack in the anti-corrosion protection at the interface between the lug and the base.

This is why, most often, it is preferred to proceed at first with the deposition of the protective layer, and then with the setup of the lugs.

Some anti-corrosion protections are weak and the mechanical stresses between some contact points of the lugs on the base covered with the anti-corrosion layer generate breaks in this protective layer. In addition, the very setup of the lugs on the base, which requires a forceful insertion of said lug into the corresponding orifice formed on the base, could cause cracks in the protective layer. Hence, these cracks and breaks are concentrated in the contact area between the lug and the orifice on the base, revealing the raw material used to make the base body. Hence, the anti-corrosion function of the protective layer is not maintained in these areas. Hence, the system as a whole is weakened.

Also, in the invention, the aim is to provide a method for making a connecting element for a bayonet connector, such as a base, which does not have all or part of the above-mentioned drawbacks. Another object of the invention is to make a connecting element for a bayonet connector, provided with lugs, and which is adapted to withstand mechanical stresses, in particular at the area of connection with the lugs, regardless of the nature of the coating that might cover said connecting element.

Another aim of the invention is to minimise the mechanical stresses on the surface protection.

The documents US2011206333 or U.S. Pat. No. 5,256,077 are known. Nonetheless, these documents do not allow meeting the requirements of the present invention.

OBJECT AND SUMMARY OF THE INVENTION

The present invention aims to overcome these drawbacks with a completely innovative approach.

These objectives, as well as others that will appear later on, are achieved using a method for making a bayonet connecting element for a connector, according to which a connecting element body, with a hollow cylindrical general shape is made, said method includes the following step:

a) a through bore is made by drilling a wall of the body of the connecting element, from the outer surface of said wall; and said method is remarkable in that it includes the following additional steps:

b) the outer surface of the wall is machined around the bore so as to create a conical contact surface around said bore;

c) a lug is inserted into the bore, from the outer surface of the wall, so that a head of the lug projects from the outer surface of the wall of the connecting element, said lug having a conical contact surface corresponding to the conical contact surface of the bore.

Thanks to these arrangements, the stresses in the lug are reduced and on the surface protection of the connector mechanics. Thanks to the conical contact surface, the lug is held in its axis, including when there is a gap in the mounting between the foot of the lug and the bore.

The conical contact surface enables a direct transmission of the force applied on the lug towards the base body.

The invention is advantageously implemented according to the embodiments and variants disclosed hereinafter, which should be considered separately or according to any technically-feasible combination.

In one embodiment, the method includes the following additional step: the operations a) to c) are repeated for each of the lugs before being mounted on the wall of the connecting element.

In one embodiment, steps a) and b) are carried out simultaneously.

In one embodiment, at step b), the angle of the conical contact surface is comprised between 30 and 60°.

In one embodiment, the method includes the following additional step: d) the rear end of the lug is crimped, mounted in the corresponding bore, on the inner surface of the wall of the connecting element.

In one embodiment, the method includes the following additional step: e) an anti-corrosion protection is applied over the outer surface of the wall of the connecting element, after having made the bore, and before having inserted the lug into said bore.

BRIEF DESCRIPTION OF THE FIGURES

Other advantages, aims and features of the present invention will appear from the following description made, for an explanatory and non-limiting purposes, with reference to the appended drawings, wherein.

DESCRIPTION OF THE EMBODIMENTS

The base is provided with a main body a connecting end of which bears the lugs, or protrusions, of the bayonet system. The lugs extend over an outer perimeter of the main body. The lugs project outwardly from the outer surface of the wall of said main body, in order to be able to cooperate with a locking ring provided with complementary orifices.

The main body of the base is provided with an insert extending longitudinally in the hollow body of the main body, said insert being provided with longitudinal housings into which contacts are intended to extend.

Figure 1:
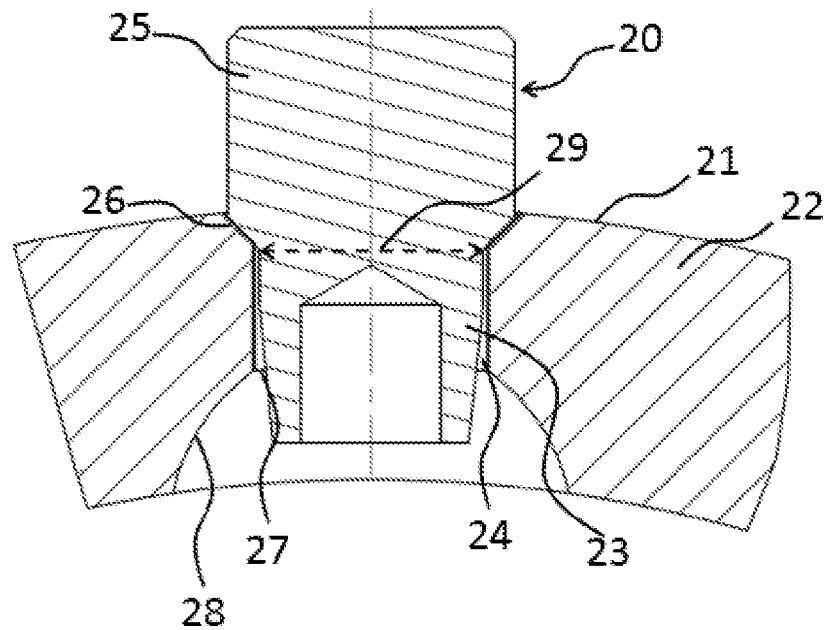
FIG. 1 represents a cross-section of a portion of the body of the base and of a lug.

FIG. 1 represents a cross-section of a portion of the body of the base and of a lug.

The lug 20 projects from the outer surface 21 of the wall 22 of the main body of the base. More specifically, the lug 20 crosses the wall 22, so that the body 23 of said lug is at least partially housed within a through orifice 24 formed in said wall 22, and so that the head 25 of said lug 20 projects from the outer surface 21 of said wall 5.

The chamfer of the bearing surface or conical contact surface 26 is drilled starting from the outer surface 21 of the wall 22 and surrounds the head 25 of the lug 20.

FIG. 1 also shows the foot of the lug 29.

Making of the lugs with a chamfer beneath the lug head 25 is carried out with conventional cam undercutting means. The means are identical to the current chamfer-less solutions.

The conical contact surface 26 could be obtained, in particular, through the use of a specific staggered drill bit. The use of a staggered drill bit avoids degrading the manufacturing rate and ensures a dimensional control of the depth of the chamfer. Except for the drill bit, machining of the mechanical bodies is carried out on conventional means.

The through bore 24 (orifice) is formed radially in the wall 22 of the main body of the base, and thus opens by a first end at the outer surface 21 of said wall 22, and by a second end 27, opposite to the first one, at an inner surface 28 of said wall 22.

The diameter of the head 25 of the lug 20 is strictly larger than the diameter of the through bore 24, so that the head 25 of the lug 20 rests on the conical contact surface 26.

More specifically, the conical contact surface 26 corresponds to the connection between the head 25 and the cylindrical body 23 of the lug 20 rests against the conical contact surface 26.

The outer surface 21 of the wall 22 is covered with a coating protecting against corrosion, or others. The deposition of this coating could be carried out by any known means and in particular by chemical, electrolytic deposition or electroplating. According to the invention, this deposition is advantageously carried out once the through bores 24 are made on the outer wall 22 of the base, and before the introduction of the lugs 20 into the corresponding bores 24.

The operation and the equipment for assembling the lug 20 evolve. The assembly operation is carried out in two steps: fitting and crimping.

The two operations must be checked under force in order to ensure control of the efforts. Fitting of the lug is carried out by application of a fitting force on the lug head 25. Fitting is stopped when the force reaches the defined limit (for example 300 N) allowing ensuring a complete fitting of the lug without exceeding the compressive stress of the surface protection beneath the lug head.

In order to guarantee the mechanical contact between the lug 20 and the base during the transition into the crimping stage, a spring system on the tooling allows pressing the mechanical body on the lug after stoppage of the application of the fitting force.

Crimping is then carried out by application of a force on the head of the lug coming into contact with a spherical snap. Crimping is stopped when the force reaches the defined limit.

Figure 2:
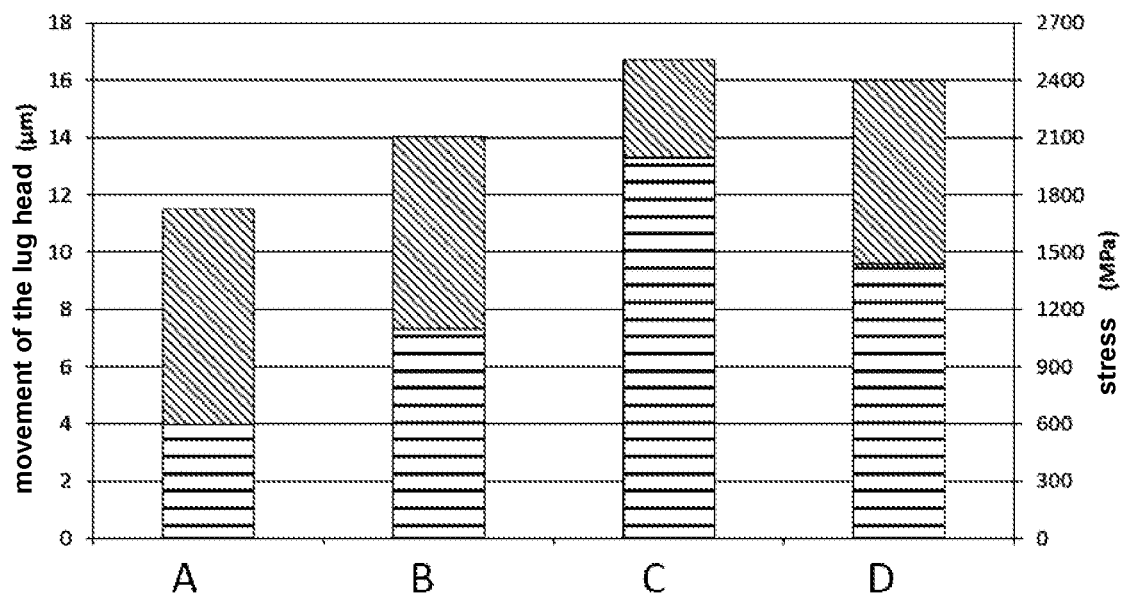
FIG. 2 represents several histograms.

FIG. 2 shows several histograms. Each column represents the movement of the lug head in μm by the effect of a radial stress exerted at the top of the lug head, represented with oblique lines combined with a stress beneath the lug head in MPa represented with horizontal lines.

Column A represents an untightened 45° chamfer.
Column B represents an untightened 30° chamfer.
Column C represents an untightened counterbore.
Column D represents a tightened counterbore.
The last two columns C and D represent the previous prior art.

The movements of the lug head under load are less with the chamfered design (A and B) in comparison with the counterbored design (C and D). The histograms confirm the reduction of the translation of the lug head thanks to the chamfer=better retention.

Reduced maximum stress beneath the lug head with the chamfered design (A and B) in comparison with the counterbored design (C and D). The histograms confirm the reduction of the stresses on the protection during locking=better robustness of the design.

There are several benefits in the present invention which are listed hereinafter.

The conical contact surface allows ensuring a mechanical contact between the head of the lug and the mechanical body thereby guaranteeing the retention of the lug (absence of movement of the lug head under a 220 N radial load) despite the presence of a mounting gap between the foot of the lug and the base bore.

The possibility of a mounting gap allows for a reduction (which could lead to the suppression) of the tightening level between the lug foot without any modification of the standard tolerances (according to one example: switch from a mounting with a 0/+0.11 mm tightening into a mounting with a −0.07/+0.04 mm gap/tightening). This reduction to a maximum tightening level of 0.04 mm between the foot of the lug in the bore diameter of the mechanical body leads to a compressive stress on the surface protection of the smaller bore diameter 600 MPa (ZnNi).

In case of complete suppression of tightening between the lug foot and the bore diameter, which is possible with this design, the tightening effort becomes zero thereby allowing completely eliminating the strength defect of the surface protection in this area.

The possibility of a mounting gap allows for an increase of the tolerances on the lug foot diameter for a given bore diameter (with a protection thickness). This increase enables the rationalisation of the lugs that could be used for various designs of connectors and the selection of surface protection (different thicknesses).

The presence of a conical bearing surface results in an increase of the projected bearing surface (+100%) between the lug head and the mechanical body. This increase is related to the conical geometry avoiding the need for forming a spoking between the bore and the external diameter of the connector body. This spoking is necessary on a standard design (simple bore) to avoid point effects when carrying out an electrolytic surface protection (point effect leading to the degradation of the protection during mounting). The increase of the bearing surface allows for a reduction (−50%) of the stresses on the surface protection during fitting of the lug. This enables the use of a surface protection with a strength lower by 50% for a given design. For 300 N fitting forces (necessary with a tightening >0.04 mm), the stress on the surface protection beneath the lug head is then lower than 300 MPa enabling the use of a protection with a lower mechanical strength <300 MPa. In the case of a design with a mounting gap, the insertion effort <50 N enable lug mounting without degradation for protections whose strength is <50 MPa.

The presence of the conical bearing surface allows dividing by two efforts on the surface protection generated by a radial force during a radial retention test.

The solution can be used by technicians for making aluminium bayonet connectors associated with protections so as to ensure a corrosion resistance function and whose strength is limited (<600 MPa) made by an electrolytic process (example: ZnNi or Ni-PTFE).

LIST OF REFERENCE SIGNS

TABLE 1

| References | Designations |
| --- | --- |
| 20 | lug |
| 21 | outer surface |
| 22 | wall of the main body |
| 23 | body |

TABLE 1-continued

| References | Designations |
| --- | --- |
| 24 | bore |
| 25 | head of the lug |
| 26 | conical contact surface |
| 27 | second end |
| 28 | inner surface |
| 29 | foot of the lug |

TABLE 2

| References | Designations |
| --- | --- |
| A | untightened 45° chamfer |
| B | untightened 30° chamfer |
| C | untightened counterbore |
| D | tightened counterbore |

The invention claimed is:

1. A method for making a bayonet connecting element for a connector, according to which a connecting element body, with a hollow cylindrical general shape is made, the method comprising:
   a) making a through bore by drilling a wall of the connecting element body of the connecting element, from an outer surface of the wall;
   b) machining the outer surface of the wall around the through bore so as to create a conical contact surface around the through bore;
   c) inserting a lug into the bore, from the outer surface of the wall, so that a head of the lug projects from the outer surface of the wall of the connecting element, the lug having a conical contact surface corresponding to the conical contact surface of the through bore.

2. The method of claim 1, repeating the steps a) to c) for each of the lugs before being mounted on the wall of the connecting element.

3. The method of claim 1, wherein the steps a) and b) are carried out simultaneously.

4. The method of claim 1, wherein an angle of the conical contact surface of the through bore is between 30 and 60°.

5. The method of claim 1, wherein a rear end of the lug is crimped, mounted in the through bore, on an inner surface of the wall of the connecting element.

6. The method of claim 1, wherein an anti-corrosion protection is applied over the outer surface of the wall of the connecting element, after having made the through bore, and before inserting the lug into the through bore.

* * * * *